(12) United States Patent
Robinson et al.

(10) Patent No.: US 8,515,179 B1
(45) Date of Patent: Aug. 20, 2013

(54) SYSTEM AND METHOD FOR HYPERSPECTRAL IMAGE COMPRESSION

(75) Inventors: Ian S. Robinson, Redondo Beach, CA (US); Bradley A. Flanders, Whittier, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 13/371,160

(22) Filed: Feb. 10, 2012

(51) Int. Cl.
*G06K 9/46* (2006.01)
(52) U.S. Cl.
USPC ........... 382/191; 382/181; 382/190; 382/232; 382/233
(58) Field of Classification Search
USPC .................. 382/181, 190, 191, 232, 233, 250, 382/251, 253; 356/632, 330, 310, 300, 328; 359/298, 615; 235/494, 454; 250/559.4
See application file for complete search history.

(56) References Cited

U.S. PATENT DOCUMENTS

| | | |
|---|---|---|
| 6,665,438 B1 | 12/2003 | Lin |
| 6,701,021 B1 | 3/2004 | Qian et al. |
| 6,750,964 B2 | 6/2004 | Levenson et al. |
| 6,782,138 B1 | 8/2004 | Leisner et al. |
| 6,804,400 B1 | 10/2004 | Sharp |
| 6,859,275 B2 * | 2/2005 | Fateley et al. ................. 356/330 |
| 6,940,999 B2 | 9/2005 | Lin |
| 6,952,499 B1 | 10/2005 | Vititoe |
| 7,180,588 B2 * | 2/2007 | Geshwind et al. ............ 356/310 |
| 7,194,111 B1 | 3/2007 | Schaum et al. |
| 7,251,376 B2 | 7/2007 | Qian et al. |
| 2003/0012398 A1 | 1/2003 | Sunshine et al. |
| 2004/0218172 A1* | 11/2004 | DeVerse et al. ............... 356/300 |
| 2006/0247514 A1 | 11/2006 | Panasyuk et al. |
| 2009/0074297 A1 | 3/2009 | Robinson |
| 2010/0303371 A1 | 12/2010 | Robinson et al. |

FOREIGN PATENT DOCUMENTS

CN  101763445 A  6/2010

OTHER PUBLICATIONS

Manolakis et al., "Is there a best hyperspectral detection algorithm?", SPIE—Newsroom; pp. 1-3 (2209).
Boardman, J., et al., Mapping Target Signatures VIA Partial Unmixing of Aviris Data, Citeseer 1995.
Kuybeda, O., et al., Global Unsupervised Anomaly Extraction and Discrimination in Hyperspectral Images via Maximum Orthogonal-Complements Analysis, Feb. 2008, Department of Electrical Engineering Technion IIT, Haifa 32000, Israel, Retrieved from Internet<URL: http://webee.technion.ac.il/uploads/file/publication/684.pdf.
Sun, L., et al., "Improved Iterative Error Analysis for Endmember Extraction from Hyperspectral Imagery", SPIE Imaging Spectrometry XIII, vol. 708, pp. 400-407, Intro., Sec 2.2—pp. 3-5 (Aug. 2008).
Veganzones, M.A., et al., "Endmember Extraction Methods: A Short Review", pp. 400-407 (Sep. 2008).

(Continued)

*Primary Examiner* — Ali Bayat
(74) *Attorney, Agent, or Firm* — Pierce Atwood LLP; Joseph M. Maraia (57) ABSTRACT

Methods for compressing hyperspectral image data include receiving sets of coefficients associated with each pixel of the hyperspectral image data, a set of basis vectors utilized to generate the dimensionally reduced data from the hyperspectral image, and either a maximum error value or maximum data size. The methods include associating the coefficients with a subset of the basis vectors, and storing the association. Methods of decompressing the compressed hyperspectral image data are also disclosed, utilizing the association.

15 Claims, 3 Drawing Sheets

(56) References Cited

OTHER PUBLICATIONS

Duran, O., et al., "A Time-Efficient Method for Anomaly Detection in Hyperspectral Images", IEEE Transactions on Geoscience and Remote Sensing, IEEE Service Ctr., NJ, US, vol. 45, No. 12, pp. 3894-3904 (Dec. 2007).

Plaza, A., et al., "Spatial/Spectral Endmember Extraction by Multi-dimensional Morphological Operations", IEEE Transactions on Geoscience and Remote Sensing, IEEE Service Ctr., NJ, US, vol. 40, No. 9, pp. 2025-2029 (Sep. 2002).

Plaza, A., et al., "A New Approach to Mixed Pixel Classification of Hyperspectral imagery based on extended Morphological profiles", Pattern Recognition, Elsevier, vol. 37, No. 6, pp. 1097-1116 (Jun. 2004).

Rogge, D.M., et al., "Integration of spatial-spectral information for the improved extraction of endmembers", Remote Sensing of Environment, Elsevier, vol. 110, No. 3, pp. 287-303 (Aug. 2007).

Filippi, A.M., et al., "Support Vector Machine-Based Endmember Extraction", IEEE Transactions on Geoscience and Remote Sensing, IEEE Service Ctr., NJ, US, vol. 47, No. 3, pp. 771-791 (Mar. 2009).

Keshava, N., et al., "Sprectral unmixing", IEEE Signal Processing Magazine, vol. 19, No. 1, pp. 44-57, Jan. 1, 2002, XP011093745.

Rogge, D. M., et al., "Iterative Spectral Unmixing for Optimizing Per-Pixel Endmemeber Sets", IEEE Transactions on Geoscience and Remote Sensing, IEE Service Center, vol. 4, No. 12, pp. 3725-3736 (Dec. 2006).

Plaza, Antonio, et al., "A Quantitive and Comparative Analysis of Endmemeber Extraction Algorithms From Hyperspectral Data", IEEE 2004.

Robinson, I., et al. "Comparison of Hyperspectral Sub-Pixel Detection with and Without a Prior Knowledge of Target Features", Aerospace Conference, 1998 IEEE Snowmass at Aspen, Colorado, Mar. 21-28, 1998, vol. 5, pp. 183-189, Mar. 21, 1998, XP010287059, ISBN 978-0-7803-4311-5.

Winter, Michael, "Comparison of Approaches for Determining Endmembers in Hyperspectral Data", IEEE 2000.

Winter, Michael, "N-FINDR: An Algorithm for Fast Autonomous Spectral End-member Determination in Hyperspectral Data", SPIE 1999.

Ulug Bayazit, Region Adaptive Spectral Transformation for Wavelet Based Color Image Compression, Image Processing (ICIP), 2009 16th IEEE International Conference ON, IEEE, Pscataway, NJ, Nov. 7, 2009, pp. 2817-2820, Section 2 and 3.

Dohyun Ahn et al., "Rate-Distortion Optimized Image Compression Using Generalized Principal Component Analysis", Acoustics, Speech and Signal Processing, 2006. ICASSP 2006 Proceedings. 2006 IEEE International Conference on Toulouse, France May 14-19, 2006, pp. 5-8.

Marco F. Duarte et al., "Structured Compressed Sensing: From Theory to Applications", IEEE Transactions on Signal Processing, IEEE Service Center, New York, vol. 59, No. 9, Sep. 1, 2011, pp. 4053-4085.

Pickering M R et al., "Compression of Hyperspectral Data Using Vector Quantisation and the Discrete Cosine Transform", Image Processing, 2000, Proceedings. 2000 International Conference on Sep. 10-13, 2000, IEEE, Piscataway, NJ, Sep. 10, 2000, pp. 195-198, vol. 2.

\* cited by examiner

FIG. 3 a# SYSTEM AND METHOD FOR HYPERSPECTRAL IMAGE COMPRESSION

CROSS-REFERENCE TO RELATED APPLICATIONS

This application is related to U.S. patent application Ser. No. 13/302,504, entitled "Spectral Image Dimensionality Reduction System and Method," filed Nov. 22, 2011, U.S. patent application Ser. No. 13/085,883, entitled "Optimized Orthonormal System and Method for Reducing Dimensionality of Hyperspectral Images," filed Apr. 13, 2011, U.S. patent application Ser. No. 12/475,145, entitled "System and Method for Reducing Dimensionality of Hyperspectral Images," filed May 29, 2009, and U.S. patent application Ser. No. 11/856,588, entitled "Hyperspectral Image Dimension Reduction System and Method," filed Sep. 17, 2007, the disclosures of each of which are hereby incorporated by reference in their entireties.

BACKGROUND

This disclosure relates to compression of hyperspectral image data, based on an optimized set of basis vectors. It may be understood that compression reduces the size of a data set, however may typically results in a loss of access to information content. In some cases, certain data from the data set is irretrievably lost (i.e. lossy compression), while in other cases the entirety of the data is maintained (i.e. lossless compression). Although in some cases information from the data set may be readily accessed and utilized while the data set is in its reduced size (i.e. dimensionality reduction), it is generally understood that other compression techniques would require an additional decompression step in order to return the data to a usable form.

Hyperspectral sensors can collect image data across a multitude of spectral bands through a combination of technology associated with spectroscopy and remote imaging. Thus, such sensors can capture sufficient information to derive an approximation of the spectrum for each pixel in an image. In addition to having a color value, each pixel in the image additionally has a third dimension for a vector providing distinct information for the pixel over a large spectrum of wavelengths. This contiguous spectrum may be analyzed to separate and evaluate differing wavelengths, which may permit finer resolution and greater perception of information contained in the image. From such data, hyperspectral imaging systems may be able to characterize targets, materials, and changes to an image, providing a detection granularity which may exceed the actual resolution of pixels in the image and a change identification capability that does not require pixel level registration, which may provide benefits in a wide array of practical applications.

Because each pixel carries information over a wide spectrum of wavelengths, the size of a hyperspectral data set may often quickly become unwieldy in terms of the size of data that is being recorded by the hyperspectral sensor. As an example, hyperspectral sensors are often located remotely on satellites or aircraft capable of imaging areas in excess of 500 km×500 km per hour, which may result in the hyperspectral sensors generating anywhere from three to fifteen gigabits of data per second. Where the hyperspectral data needs to be processed in near real time, the large size of the data may introduce latency problems. In some cases, it may be desirable to transmit the data to a remote location for processing or other analysis, which again would make a reduced data size desirable.

Although the transmission rate for hyperspectral images can be increased using existing lossy and/or lossless compression techniques, these techniques also suffer from various drawbacks. For example, while lossy compression methods may be fine for casual photographs or other human viewable images, wherein the data that is removed may be beyond the eye's ability to resolve, applying such lossy compression methods to a hyperspectral data set may remove information that is valuable and desired for further computer or mathematical processing. Such removal of data may undermine the ability to characterize targets, materials, or changes to scenes that are captured in hyperspectral images. Lossless data compression would not remove such valuable information, since lossless algorithms produce a new data set that can subsequently be decompressed to extract the original data set. Although general purpose lossless compression algorithms can theoretically be used on any type of data, existing lossless compression algorithms typically cannot achieve significant compression on a different type of data than that which the algorithms were designed to compress. Thus, existing lossless compression algorithms do not provide a suitable guaranteed compression factor for hyperspectral images, and in certain cases, the decompressed data set may even be larger than the original data set.

It may be appreciated that a greater reduction of data size may be realized by a compression technique than by a dimensionality reduction technique. In some cases, the greater reduction in data size may outweigh the benefit of being able to process dimensionally reduced data. It may be appreciated, however, that once such data is compressed, an additional decompression step would generally be required in order to process the data. Although some compression techniques may be applied to hyperspectral image data directly, in some cases the hyperspectral image data may be dimensionally reduced prior to being further reduced in size through compression. It may be appreciated that such compression may allow for a greater reduction in data size, while still permitting faster processing of the most relevant data once it is decompressed. In the context of hyperspectral imaging, such processing generally means that the data is exploited for target detection, anomaly detection, material identification, classification mapping, or so on. In some cases, the dimensionally reduced hyperspectral data that may be further compressed may include a family of functions or a set of vectors whose arithmetic combination can represent all of the data in a three-dimensional (3D) data set. Hyperspectral image data is generally discrete, so at each X/Y location in a hyperspectral image the spectral data may form elements of a vector. Depending on the nature of these vectors, they may either be characterized as endmembers or basis vectors. While basis vectors span the data obtained from the image, and form a mathematical basis for the data, endmembers are pixels from an imaged scene (or extrapolations of pixels in the scene), that represent the spectra of a pure material found in the scene. In some cases, endmembers are derived such that they enclose or bound the data set (as in a hypervolume or a simplex).

Because dimensionally reduced data (DIMRED data) may be generated from hyperspectral image data (HSI data) processed using one or more of a variety of analysis techniques, it may be understood that compression of such DIMRED data may be performed as a post-processing technique subsequent to the dimensionality reduction process. As an example, compression post-processing techniques may be applied to the dimensionality reduced output of techniques such as those disclosed in the related applications incorporated by reference above, which compute geometric basis vectors. As another example, compression may also be applied to the dimensionality reduced outputs of other hyperspectral image processing mechanisms, including but not limited to Principal Components Analysis, which computes "statistically derived" basis vectors that span a scene in an optimal mean-square sense. Regardless, it may be appreciated that among other things, it is advantageous to increase the speed at which the dimensionality of hyperspectral images is reduced, improve reduction of data volume sizes, and/or improve the identification of which data is to be segregated for compression or not.

SUMMARY

According to an embodiment, a method for compressing hyperspectral image data having a number of spatial pixels associated with a hyperspectral image, and a number of spectral dimensions associated with each spatial pixel, includes receiving sets of coefficients associated with each pixel of the hyperspectral image data, a set of basis vectors utilized to generate the dimensionally reduced data from the hyperspectral image, and a maximum error value. The method also includes verifying whether the set of basis vectors is a set of orthonormal basis vectors if unknown, and if not, converting the set of basis vectors to the set of orthonormal basis vectors, and modifying the coefficients in response to said converting. The method additionally includes ranking, using the processor, a magnitude of each of the set of coefficients on a per pixel basis. The method also includes computing, using the processor, a minimal set of coefficients from the set of coefficients by computing an error associated with one or more subsets of the set of coefficients and selecting coefficients wherein the magnitude is larger over coefficients where the magnitude is smaller, and comparing the error of the one or more subsets with the received maximum error. The method also includes storing an association between the minimal set of coefficients and a subset of the set of orthonormal basis vectors. The method furthermore includes outputting, using the processor, compressed data comprising the minimal set of coefficients for each pixel, the set of orthonormal basis vectors, and the association.

According to another embodiment, a method for compressing hyperspectral image data having a number of spatial pixels associated with a hyperspectral image, and a number of spectral dimensions associated with each spatial pixel, includes receiving sets of coefficients associated with each pixel of the hyperspectral image data, and an error magnitude associated with each pixel of the hyperspectral image data. Also received is a set of basis vectors utilized to generate the dimensionally reduced data from the hyperspectral image. Additionally received is a maximum data size. The method also includes verifying whether the set of basis vectors is a set of orthonormal basis vectors if unknown, and if not, converting the set of basis vectors to the set of orthonormal basis vectors and modifying the coefficients in response to said converting. The method also includes ranking, using the processor, a magnitude of each of the set of coefficients. The method also includes computing, using the processor, a maximum number of coefficients based on the maximum data size. The method also includes selecting, using the magnitude of each of the set of coefficients and the maximum number of coefficients, a maximum sized subset of the set of coefficients. The method additionally includes storing an association between the maximum sized subset of the set of coefficients and a subset of the set of orthonormal basis vectors. The method furthermore includes outputting, using the processor, compressed data comprising the maximum sized subset of the set of coefficients for each pixel, the set of orthonormal basis vectors, and the association.

According to another embodiment, a method of decompressing compressed hyperspectral image data includes receiving (i) sets of coefficients associated with a hyperspectral image, each set being associated with a spatial pixel of the hyperspectral image, (ii) a set of basis vectors associated with the hyperspectral image, and (iii) an association between the sets of coefficients and the set of basis vectors. The method also includes multiplying each of the set of basis vectors by the coefficients of each spatial pixel according to the association to form an approximation of the hyperspectral image data. The method further includes outputting the approximation of the hyperspectral image data.

Other features of this disclosure and the inventive concept described herein will be apparent to those skilled in the art based on the following drawings and detailed description.

DETAILED DESCRIPTION

During many types of hyperspectral image processing, a set of basis vectors are generated which may be used to reduce the dimensionality of the hyperspectral image data by unmixing. Unmixing may be unconstrained unmixing or constrained so that unmixing coefficients are non-negative and/or sum to unity. In preferred embodiments, unconstrained unmixing may be employed, as it is generally faster and simpler than other unmixing techniques, and the basis vectors derived are not intended to be endmembers. It may be appreciated that the number of basis vectors needed to accurately represent the hyperspectral image data may vary depending on the processing technique. While some processing techniques, such as Principal Components Analysis, compute a basis vector for every color of hyperspectral data (although not all are necessarily retained), in other processing techniques, such as that described in U.S. patent application Ser. No. 13/085,883, the number of basis vectors computed is a user-selectable variable. It may be appreciated that regardless of how many basis vectors are computed, this number may ultimately be reduced, so as to either minimize the amount of data retained (i.e. the volume of the reduced data) for a given error level, or to minimize the error level (i.e. the worst-case error or the root mean square "RMS" error between an unreduced pixel and its reduced counterpart) computed for any pixel for a given amount of data retained. It may be appreciated that the fewer basis vectors being retained, the greater the reduction/compression, however, the larger the error (in particular in the tails of the data). It is clear, however, that the full set of unreduced pixels is of a much greater data volume.

Methods are disclosed herein for compressing either original HSI data or the DIMRED data as compressed data. Although in some embodiments the methods may be performed immediately following one or more processing techniques that generate an associated set of basis vectors, in other embodiments the methods may be performed as a separate process, at a later time, or on a separate computational system. In some embodiments, the one or more processing techniques that output the set of basis vectors or the DIMRED data are performed on a per-pixel basis (i.e. for each X, Y spatial location of the HSI or DIMRED data). The original HSI data will have C colors at each spatial location. The DIMRED data will comprise pixels with fewer than C elements at each X, Y, spatial location, plus selected unreduced pixels that retain C colors. It may be appreciated that pixels in the scene that are reduced, are reduced by unmixing the original pixels with N basis vectors, as described below. The resulting unmixing coefficients form the elements of the DIMRED data, and may be used along with the N basis vectors to form an approximation of the original HSI data at each pixel.

In an embodiment, prior to one or more of the methods being performed, a user may select which method is to be run, by designating whether a maximum value is to be established for the compressed data volume or the compressed data error levels. Such a selection may be made by any appropriate mechanism, including but not limited to receiving a user input of the selection on a graphical user interface associated with a system performing the methods. In other embodiments, the system may have associated therewith one of the methods, fixing either the maximum data volume or the maximum data error levels.

Figure 1:
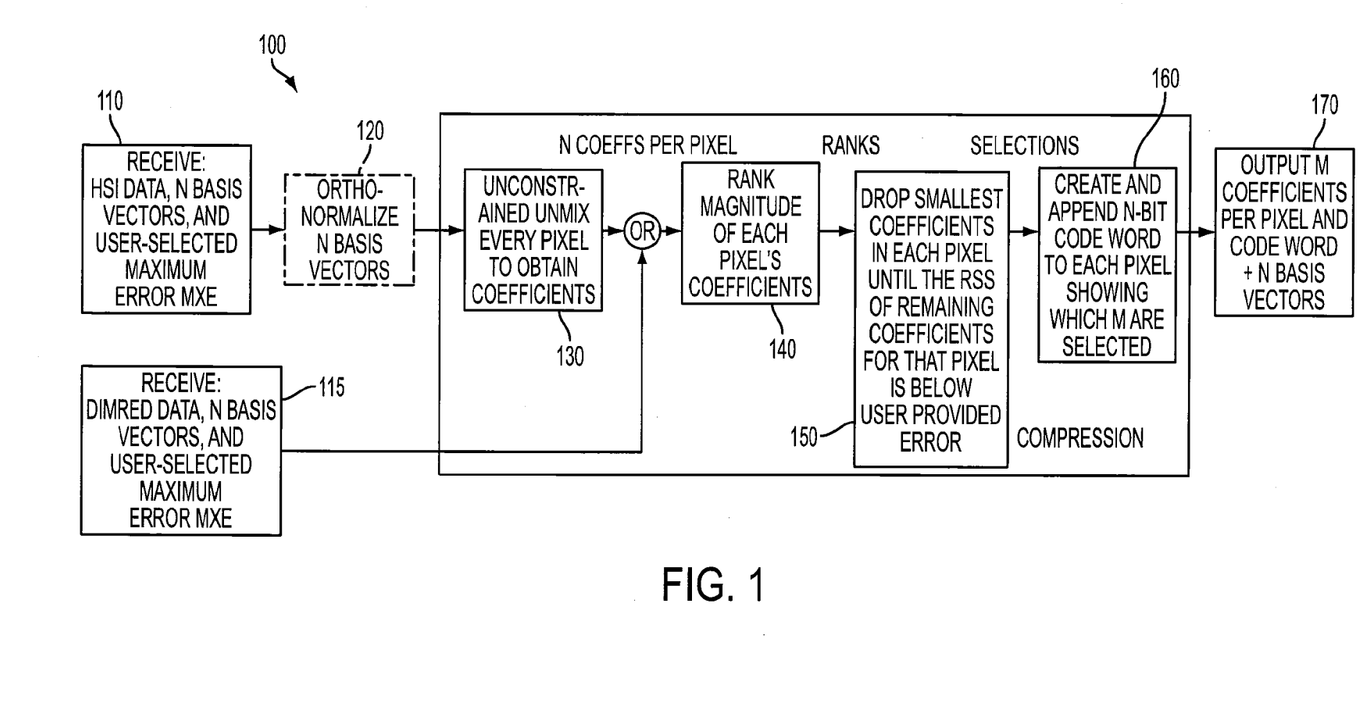
FIG. 1 illustrates an embodiment of a method for compressing dimensionally reduced data associated with a hyperspectral image, minimizing data size based on a maximum error level.

FIG. 1 illustrates an embodiment of method 100, configured to reduce the size of the HSI data or the DIMRED data into compressed data having a selected amount of worst case error. To be clear, where the user selects a maximum error level, method 100 is configured to package the HSI data or the DIMRED data in a smaller format, where the data size of the smaller format is minimized while the data itself is preserved within that error level. Accordingly, in some embodiments method 100 may begin at 110 by receiving the user-selected maximum error mxe, the original HSI data, as well as a set of N basis vectors associated with the HSI data. It may be appreciated that the set of N basis vectors may comprise an output of the processing techniques on the HSI data, and may have a number of spatial pixels and reduced dimension of spectral data. In some alternative embodiments, method 100 may begin at 115, by receiving DIMRED data (i.e. the dimensionally reduced output of the processing techniques that form the set of N basis vectors), in lieu of the HSI data, as described in greater detail below. The DIMRED data may contain a set of coefficients associated with each spatial pixel. As further indicated below, in some embodiments where the DIMRED data is received at 115 instead of the HSI data being received at 110, additional information must be transmitted for each pixel so that residual errors for different sets of coefficients may subsequently be calculated. In some embodiments where the DIMRED data is received instead of the HSI data, the magnitude p of each pixel of the unreduced HSI data may be transmitted with the DIMRED data. In other embodiments, the magnitude of the error, $R_{mag}$, of each pixel of the reduced HSI data may be transmitted with the DIMRED data. Furthermore, in some embodiments where the DIMRED data is received at 115, the HSI data may be available to provide the full C colors for set-aside pixels whose DIMRED approximation does not meet the error requirement mxe. Although in some embodiments the inputs received at 110 or 115 may be received as discrete data files or user-inputs, in other embodiments some of the elements may be bundled together. For example, in an embodiment a single file may contain both the HSI or DIMRED data, and the N basis vectors.

In various embodiments, the HSI data or the DIMRED data is received with the set of N basis vectors, which were used to create the DIMRED data (i.e. used to reduce the dimensionality of the original HSI data into the DIMRED data), or may be used to process the HSI data, as described below. Regardless, the processed HSI data or the DIMRED data may have N dimensions associated therewith, such that each spatial pixel data may be an N-dimensional vector $\vec{a}$, having a plurality of elements $a_k$, where k ranges from 1 to N. Each of the N basis vectors (individually $\vec{b}_k$ which are used for all spatial pixels, may also be a spectrum with C colors, with k ranging from 1 to N. It may then be appreciated that each pixel vector $\vec{p}$ of the HSI data, may then be approximated as a linear combination of the N basis vectors, with the coefficients $a_k$ of the DIMRED data, such that each pixel vector $\vec{p}$ may generally conform to the formula:

$$\vec{p} = \sum_{k=1}^{N} a_k \vec{b}_k + \vec{R},$$

where $a_k$ are the reduced dimension coefficients for each pixel, and the N basis vectors $\vec{b}_k$ are common for the whole scene. Additionally, $\vec{R}$ may be appreciated as the residual vector, or the error vector.

It may be appreciated that in some embodiments, the N basis vectors may be every basis vector utilized in generating the DIMRED data, or are otherwise associated with the HSI data, while in other embodiments, the N basis vectors may be a subset of the basis vectors utilized in generating the DIMRED data or are otherwise associated with the HSI data. In some embodiments where the N basis vectors are a subset of the basis vectors used to generate the DIMRED data or otherwise associated with the HSI data, the number N of basis vectors may be selected as a user input. In an embodiment, the set of N basis vectors received at 110 or 115 may be in an order established during the generation of the DIMRED data or during the processing of the HSI data (i.e. where the set of N basis vectors are generated sequentially). For example, the set of N basis vectors may be generated using the process described in U.S. patent application Ser. No. 13/085,883, incorporated by reference above. In another embodiment, where the set of N basis vectors was generated using Principal Components Analysis, the set of N basis vectors may be in the order of largest to smallest associated eigenvalues (whereby the eigenvalue indicates how much an associated eigenvector contributes to the whole spatial scene). In one such embodiment, the set of N basis vectors may then be those that had the largest associated eigenvalues.

While in some embodiments, such as where method 100 immediately follows the processing technique as a post-processing technique that generates the set of N basis vectors, the data received at 110 or 115 may be obtained from random access memory associated with the system and used to process the HSI data or otherwise generate DIMRED data, in other embodiments such as where method 100 is being performed later, the data received at 110 or 115 may be stored in one or more data files stored in a storage medium, such as but not limited to being on one or more hard drives or solid state drives. In some embodiments, such as where the method 100 is performed as a post-processing step that has access to data utilized in reducing the dimensionality of the hyperspectral image data to the DIMRED data or otherwise processing the HSI data to generate the set of N basis vectors, the data received at 110 or 115 may include the results of the computations that calculated the N basis vectors. In some such embodiments, those computations and results may be available for performing the compression of method 100. In other embodiments, however, one or more of the computations may need to be recalculated if otherwise unavailable.

It may be appreciated that in some embodiments the N basis vectors received at 110 may be orthonormal basis vectors. Specifically, the N basis vectors may be both orthogonal to one another and normalized (i.e. having unit length). It may be understood that the orthonormality of the basis vectors may be a result of the processes that generate the DIMRED data from the original hyperspectral image data. Alternatively, a separate post-processing method may be performed prior to method 100 to orthonormalize the basis vectors of the DIMRED data. As shown in the illustrated embodiment, method 100 may include at 120 an optional orthonormalization step, which may determine whether the N basis vectors are orthonormal, and if not, orthonormalize the N basis vectors using any appropriate known computation, and modifying the coefficients $a_k$ accordingly, based on the orthonormalizing.

Once it is verified at 120 that the N basis vectors are orthonormal (and potentially orthonormalizing the N basis vectors if they previously were not orthonormalized), or after receiving the orthonormal basis vectors with the DIMRED data at 115, method 100 may continue at 130 by unmixing the maximum number of N basis vectors from each pixel of the HSI data to generate the coefficients $a_k$ of the DIMRED data. Unmixing, as used herein without further modifiers, is understood to generically refer to the broad concept of unconstrained unmixing. As described below, unmixing the basis vectors $\vec{b}_k$ from each pixel $\vec{p}$ bis utilized in calculating the error vector $\vec{R}$ associated with each pixel $\vec{p}$, and the associated magnitude $R_{mag}$, when minimizing the data size to further reduce the dimensionality of the data within a maximum error amount mxe. It may be appreciated that where the basis vectors are orthonormal, the unmixing at 130 may be completed all at once. Additionally, in some embodiments, the unmixing of each of the N basis vectors with each pixel at 130 may have been previously performed when creating the DIMRED data. In some such embodiments, the resulting coefficients from the unmixing may be stored in memory or one or more other storage mediums, and may be recalled in lieu of the unmixing at 130. Regardless, it may be appreciated that N coefficients $a_k$ per spatial pixel vector $\vec{p}$ may be generated or otherwise received at 130.

Where the DIMRED data is received at 115, it may be appreciated that the set of N basis vectors received therewith may in some embodiments already be orthonormal to one another, having been established in the processes that create the DIMRED data. As indicated above, such processes may include those described in U.S. patent application Ser. No. 13/085,883, incorporated by reference above. If the N basis vectors are not orthonormal to each other, however, then an orthonormalization step (similar to orthonormalizing the N basis vectors at 120) may be performed after receiving the DIMRED data at 115 to recalculate the coefficients $a_k$ appropriately.

Regardless of whether the HSI data is unmixed at 130, or the DIMRED data is received at 115, it may be appreciated that the set of N coefficients $a_k$ per pixel $\vec{p}$ are received or are otherwise generated in method 100. It may also be appreciated for a given pixel $\vec{p}$, by identifying those coefficients $a_k$ that are associated with the greatest contribution to the pixel $\vec{p}$, and eliminating those that do not strongly affect the representation of the colors C of the original spectrum (or the dimensions N of the DIMRED data), the data may be appropriately compressed to achieve a smallest possible size within the user-selected maximum error mxe. As such, once the N coefficients $a_k$ per pixel $\vec{p}$ are established, method 100 may continue at 140 by ranking the magnitude of each pixel's coefficients $a_k$. It may be understood that smaller values of the coefficients $a_k$ correspond to a lesser importance of the associated basis vector $\vec{b}_k$ in generating the coefficient $a_k$ for that pixel $\vec{p}$. Because the N basis vectors are orthonormal (or have been orthonormalized), the coefficients $a_k$ associated with the N basis vectors $\vec{b}_k$ may be sorted in a simple manner, by rearranging the elements $a_k$ of the pixel from greatest value of $a_k$ to smallest value of $a_k$. It may be appreciated that ranking the coefficients $a_k$ at 140 may further include keeping track of which basis vectors $\vec{b}_k$ are associated with which coefficients $a_k$.

Method 100 may then proceed at 150 to determine an optimal number M of the N basis vectors $\vec{b}_k$ to retain. In particular, determining the optimal number M may comprise computing the error vector $\vec{R}$ associated with maintaining a particular number of coefficients $a_k$ on a per pixel basis. In an embodiment, this may comprise dropping the smallest of the as-ranked coefficients $a_k$ from each pixel $\vec{p}$, and computing the Root Sum Square ("RSS") error of a remaining set of M coefficients $a_k$ for each pixel $\vec{p}$, to determine the smallest number (i.e. the smallest value of M) of coefficients $a_k$ that results in a magnitude $R_{mag}$ of the error $\vec{R}$ being less than the user-selected maximum error mxe. In an embodiment, computing the magnitude of the error based on a particular subset of the as-ranked coefficients $a_k$ may comprise a simple algebraic computation for each pixel $\vec{p}$, based on the number of basis vectors $\vec{b}_k$ (and coefficients $a_k$) utilized for that pixel. For example, as indicated above, the residual vector $\vec{R}$, representing the error in each color may conform to:

$$\vec{R} = \vec{p} - \sum_{k=1}^{N} a_k \vec{b}_k.$$

It may be appreciated that the fractional error may also be computed, specifically by dividing the magnitude $R_{mag}$ of the error vector $\vec{R}$ by the magnitude of the pixel vector $\vec{p}$. It may be appreciated, however that in some embodiments the C colors may be weighted differently when calculating the magnitude $R_{mag}$ of the error vector $\vec{R}$.

Because the basis vectors are orthonormal, having unity magnitude and being mutually orthogonal, the coefficient $a_k$ for any pixel $\vec{p}$ would be the simple dot product:

$$a_k = p \cdot b_k.$$

Additionally, the dot product of any two orthogonal vectors is zero, and the dot product of any orthonormal vector with itself is unity. Furthermore, the magnitude $R_{mag}$ of the error vector $\vec{R}$ for orthonormal basis vectors is computed by summing the squares of the coefficients in reduced dimensions, allowing for faster error calculations than when the basis vectors were not orthonormal. Thus, the error $R_{mag}$ is the square root of the difference between the magnitude p of pixel vector $\vec{p}$ and the sum of the squares of the DIMRED coefficients $a_k$. Specifically, the error calculation would simplify to:

$$R_{mag} = \sqrt{|\vec{p}|^2 - RSS(a_k)} = \sqrt{\vec{p} \cdot \vec{p} - \sum_{k=1}^{N} a_k^2}.$$

This computation may be especially fast when computing subsets of the full set of N basis vectors. It may be appreciated that some of this increased speed in computation may result from the fact that the magnitude p of each pixel $\vec{p}$ will be constant for a given data set and need only be computed once. Additionally, the summation associated with the coefficients $a_k$ may facilitate using prior coefficient computations to complete subsequent coefficient computations. As an example, it may be understood that the error is dependent upon how many basis vectors are retained from the original set. As such, the error equation may be represented as:

$$R_{mag(M)} = \sqrt{\vec{p} \cdot \vec{p} - \sum_{k=1}^{M} a_k^2},$$

where M represents the number of basis vectors utilized, and may range from 1-N. It may be appreciated that in some embodiments, the iterative error calculation may increase the set of coefficients $a_k$ (i.e. growing from M=1 to M=N), to determine the smallest value of M where M coefficients $a_k$ results in an error level that is less than the maximum error mxe. It may be appreciated that other calculations of the error based on the number of basis vectors $\vec{b}_k$ and coefficients $a_k$ for each pixel may also be computed, and in some embodiments the DIMRED data may include values of the magnitude p of the pixel $\vec{p}$ and/or the magnitude $R_{mag}$ of the error $\vec{R}$, which may utilized to derive the smallest (i.e. optimum) number M of the coefficients $a_k$ and basis vectors $\vec{b}_k$. In an embodiment, calculating the error may be similar to that described in U.S. patent application Ser. No. 13/302,504, incorporated by reference above, which may include starting with computing the error utilizing 1 BV (or coefficient), using that calculation to calculate the error utilizing 2 BVs (or coefficients), and so on, until the error is below the maximum error mxe, whereby the smallest number of BV/coefficients that are below the maximum error mxe would be selected. In another embodiment, the minimum error magnitude using all coefficients (which may be provided at 115, after being calculated by the DIMRED processing) may be utilized as a starting point, and coefficients may be dropped from the smallest up, each increasing the error magnitude, until the error magnitude exceeds the maximum error mxe. The last coefficient, which caused the error to become too large, may then be retained along with all larger coefficients.

It may be appreciated that the set of M coefficients $a_k$ may be considered a compressed pixel $\vec{p}_{comp}$, which may be assembled or otherwise associated with a spatial location analogous to a corresponding pixel $\vec{p}$. For each compressed pixel $\vec{p}_{comp}$, a different subset M of the N coefficients $a_k$ may be maintained, and as such, may be associated with a different set of M of the original N basis vectors to compress the DIMRED data into the compressed data. Accordingly, the association of which M of the N basis vectors $\vec{b}_k$ are to be utilized with the selected set of M coefficients $a_k$ in the compressed pixel $\vec{p}_{comp}$ may be recorded or otherwise stored, so that the compressed data (formed from the various compressed pixels $\vec{p}_{comp}$) may be subsequently decompressed, as described below. Although the association may be recorded or otherwise stored in any appropriate fashion, in the illustrated embodiment, method 100 proceeds at 160 by appending to each compressed pixel $\vec{p}_{comp}$ the association of which M of the N basis vectors $\vec{b}_k$ would be needed to decompress that compressed pixel $\vec{p}_{comp}$. It may be appreciated that in some embodiments, the association may be considered a "code" that allows for the subsequent decompression. As such, it may be appreciated that by encrypting the code, the overall compressed data itself may be encrypted. In an embodiment, the association may comprise an N-bit array of data, which may use binary encoding for each basis vector's inclusion, to indicate which M of the N basis vectors $\vec{b}_k$ are to be utilized to decompress the data. In another embodiment, the association may comprise an M-element array of data, which may include a list of which basis vectors are needed to decompress the associated pixel.

Method 100 may conclude at 170 by outputting the compressed data, which may be in the form of a spatial array of compressed pixels $\vec{p}_{comp}$, each of which may contain differently sized sets of the associated coefficients $a_k$ (again, M may vary from pixel to pixel), with the code linking the reduced number of coefficients $a_k$ with a particular M-sized subset the full set of N-basis vectors appended thereto. Accordingly, the full set of N basis vectors may also be output at 170, such that the combination of the reduced sets of coefficients $a_k$, the code, and the full set of N-basis vectors would allow for the compressed data to be subsequently decompressed. Because the original coefficients associated with the DIMRED data are dropped at 150, it may be appreciated that the compression of method 100 is a lossy process. While the compressed data approximates the DIMRED data received at 110 (to within the maximum error mxe), it the lost data is no longer retrievable following the compression.

Figure 2:
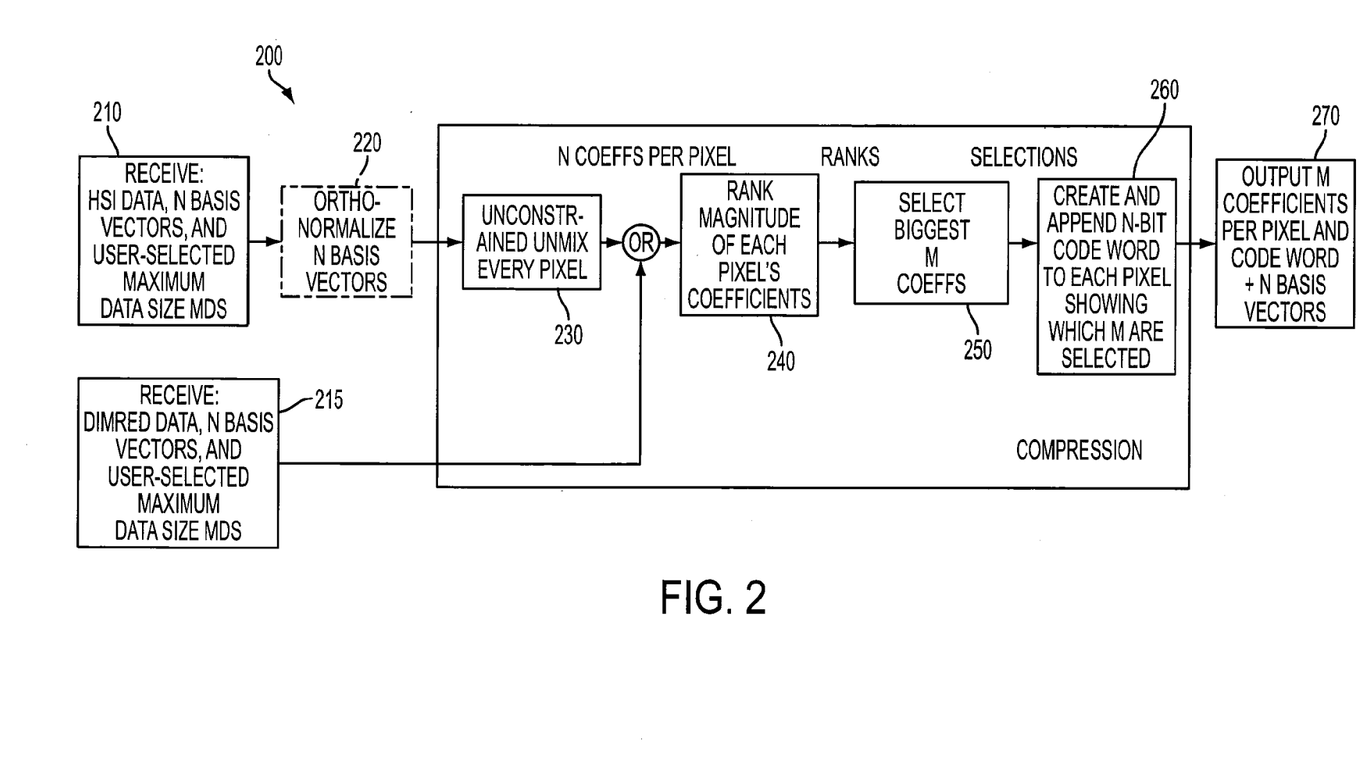
FIG. 2 illustrates an embodiment of a method for compressing dimensionally reduced data associated with a hyperspectral image, minimizing an error level based on a maximum data size.

While the compression of method 100 allows minimizing data volume within a user-selected error level, it is also possible to compress the DIMRED data to minimize error for a user-selected maximum data volume. For example, FIG. 2 illustrates method 200 configured to ensure that the DIMRED data is compressed to within a maximum data size mds, while selecting the best coefficients $a_k$ that result in a smaller error. Method 200 begins at 210 by receiving the user selected maximum data size mds, the HSI data, and the set of N basis vectors $\vec{b}_k$ associated with the HSI data. Besides for receiving the user-selected maximum data size mds in lieu of the maximum error mxe, such receiving of the inputs at 210 may generally be similar to 110 of method 100. In some alternative embodiments, method 100 may begin at 215, by receiving DIMRED data (i.e. the set of coefficients $a_k$ associated with the spatial pixels that is generated during the processing techniques that form the set of N basis vectors), in lieu of the HSI data, along with either the pixel magnitude, p, or the pixel error magnitude, $R_{mag}$. It may be appreciated that where the DIMRED data is received at 215, the HSI data may be available to provide additional set-aside pixels based on the optimization performed in method 200. Except for receiving the user-selected maximum data size mds in lieu of the maximum error mxe, such receiving of the inputs at 215 may generally be similar to 115 of method 100. Again, while in some embodiments the inputs received at 110 or 115 may be received as discrete data files or user-inputs, in other embodiments some of the elements may be bundled together. For example, in an embodiment a single file may contain both the HSI or DIMRED data, and the N basis vectors.

As above with method 100, it may be appreciated that in some embodiments the N basis vectors received at 210 may be orthonormal basis vectors. In some embodiments, the orthonormality of the basis vectors may be a result of the processes that generate the DIMRED data from the original hyperspectral image data. In other embodiments, however, a separate post-processing method may be performed prior to or within method 200 to orthonormalize the basis vectors of the DIMRED data. As shown in the illustrated embodiment, for example, method 200 includes at 220 an optional orthonormalization step, which may determine whether the N basis vectors are orthonormal, and if not, orthonormalize the N basis vectors. In an embodiment, such orthonormalization may be conducted as described above as pertaining to 120 of method 100.

After verifying at 220 that the N basis vectors are orthonormal (and potentially orthonormalizing the N basis vectors if they previously were not orthonormalized), or after receiving the orthonormal basis vectors with the DIMRED data at 215, method 200 may continue at 230 by unmixing the maximum number N basis vectors from each pixel of the DIMRED data, which may be conducted in a similar manner as described above as pertaining to 130 of method 100. Again, in some embodiments, the unmixing of each of the N basis vectors with each pixel at 230 may have been previously performed when creating the DIMRED data. In some such embodiments, the resulting coefficients from the unmixing may be stored in memory or one or more other storage mediums, and may be recalled in lieu of the unmixing at 230. Regardless, it may be appreciated that N coefficients $a_k$ per spatial pixel vector p may be generated or otherwise received at 230. As in method 100, if the basis vectors received in 215 are not orthonormal to each other, then an orthonormalization step (similar to orthonormalizing the N basis vectors at 220) may be performed after receiving the DIMRED data at 215 to recalculate the coefficients $a_k$ appropriately.

Method 200 may subsequently continue at 240 by ranking the magnitude of the coefficients $a_k$ for each spatial pixel p. Specifically, the coefficients $a_k$ that are associated with the greatest contribution to the pixel p may have the greatest magnitude, while those that do not strongly affect the representation of the colors C of the original spectrum (or the dimensions N of the DIMRED data) may be expendable for the compression. Because the N basis vectors are orthonormal (or have been orthonormalized), the coefficients $a_k$ associated with the N basis vectors $\vec{b}_k$ may be sorted in the simple manner described above at 140 of method 100. Once more, ranking the coefficients $a_k$ at 240 may also include keeping track of which basis vectors $\vec{b}_k$ are associated with which coefficients $a_k$.

Having ranked the coefficients $a_k$, method 200 may continue at 250 by selecting a subset of the N coefficients $a_k$ that will be used as the compressed data. It may be appreciated that the maximum data size mds may determine how many coefficients $a_k$ can be selected. For example, where each coefficient $a_k$ is of the same size, the maximum data size mds may be divided by the size of each coefficient $a_k$, to determine a number $M_{sum}$ of coefficients $a_k$ that may be retained overall across the entire scene. In one such embodiment, wherein the same number of coefficients $a_k$ are selected for each pixel (i.e. when compressed, all pixels will have the same value of M), the maximum data size mds may be divided by the number of spatial pixels to find a maximum data size per pixel, and again by the data size of each coefficient $a_k$, to determine a uniform number M of the coefficients $a_k$.

In some embodiments where the size of each coefficient $a_k$ is constant, the number M of coefficients $a_k$ may vary from pixel to pixel. In such an embodiment, when ranking the coefficients $a_k$ at 240, the coefficients $a_k$ may be ranked for all pixels $\vec{p}$ in the scene, instead of on a per pixel basis. As such, the relationship between the coefficients $a_k$ and the pixels $\vec{p}$ may be tracked during the ranking. In such an embodiment, selecting a subset M of the N coefficients $a_k$ at 250 may comprise dividing the maximum data size mds by the size of each coefficient $a_k$ to determine the number $M_{sum}$ of coefficients $a_k$ that may be retained overall across the entire scene, and the $M_{sum}$ coefficients $a_k$ may be selected, and divided based on the associated spatial pixel $\vec{p}$ into different sized sets of M coefficients $a_k$ associated with each spatial pixel $\vec{p}$. In embodiments where the data size differs between coefficients $a_k$, the selection of the $M_{sum}$ coefficients $a_k$ on a scene-wide basis, or the selection of M coefficients $a_k$ on a per-pixel basis, may be weighted by data size of the respective coefficients $a_k$. For example, to select the $M_{sum}$ coefficients $a_k$ on a scene-wide basis, the data size of each coefficient $a_k$ may be summed as the highest valued coefficients $a_k$ are selected, until the summed data size reaches the maximum data size mds, wherein the selection may complete. It may be appreciated that similar analysis of the data size for each coefficient $a_k$ may also be completed a per pixel basis. For example, the maximum data size mds may be divided by the number of pixels $\vec{p}$ to determine a maximum data size per pixel. The highest M coefficients may then be selected on a per-pixel basis, which may result in a different value for the number M from pixel to pixel.

It may be appreciated that in some embodiments the maximum data size mds may include the data size of the set of N basis vectors $\vec{b}_k$. In such embodiments, the data size of the set of N basis vectors may be subtracted from the maximum data size mds to determine a maximum data size for the M coefficients, which could be utilized to determine the value of M. In other embodiments, the maximum data size may alternatively or additionally further include the data size of the code utilized to decompress the compressed data, as described in greater detail below. In such embodiments, the data size of the code associated with the coefficients $a_k$ may be computed and accounted for as the set of $M_{sum}$ coefficients $a_k$ or the set of M coefficients $a_k$ for each pixel is being selected at 250.

Regardless, once the M coefficients $a_k$ are selected for each pixel $\vec{p}$, method 200 may continue at 260 by reconstituting the M coefficients $a_k$ from each pixel $\vec{p}$ data as compressed pixels $\vec{p}_{comp}$, which may be assembled or otherwise associated with a spatial location analogous to a corresponding pixel $\vec{p}$. As indicated above, and similar to method 100, a different subset M of the N coefficients $a_k$ may be maintained for each compressed pixel $\vec{p}_{comp}$, and as such, may be associated with a different set of M of the original N basis vectors to compress the DIMRED data into the compressed data. Accordingly, the association of which M of the N basis vectors $\vec{b}_k$ is to be utilized with the selected set of M coefficients $a_k$ in each compressed pixel $\vec{p}_{comp}$ may be recorded or otherwise stored as a decompression "code," so that the compressed data (formed from the various compressed pixels $\vec{p}_{comp}$) may be subsequently decompressed. In the illustrated embodiment, such recording of the associations is similar to that at 160 of method 100, whereby the code associating which M of the N basis vectors $\vec{b}_k$ would be needed to decompress that compressed pixel $\vec{p}_{comp}$ is appended to each compressed pixel $\vec{p}_{comp}$.

Method 200 may then conclude at 270 by outputting the compressed data, which similarly to 170 of method 100 may be in the form of a spatial array of compressed pixels $\vec{p}_{comp}$, each of which may contain differently sized sets of the associated coefficients $a_k$ (again, M may vary from pixel to pixel), with the code linking the reduced number of coefficients $a_k$ with a particular M-sized subset the full set of N-basis vectors appended thereto. Accordingly, the full set of N basis vectors may also be output at 270, such that the combination of the reduced sets of coefficients $a_k$, the code, and the full set of N-basis vectors would allow for the compressed data to be subsequently decompressed.

It may be appreciated that variations and modifications of methods 100 or 200 as described above are possible in numerous embodiments. For example, in an embodiment the set of basis vectors $\vec{b}_k$ may themselves be ranked according to their contribution to scene power. In such an embodiment, a subset L of the N basis vectors $\vec{b}_k$ may be identified (either based on obtaining a desired minimum data size mds or a desired maximum error mxe), which may be common to the subset M of the N coefficients $a_k$. In such an embodiment, the set of L basis vectors $\vec{b}_k$ may be output with the compressed data at 170 or 270, while the code associated with the M−L coefficients $a_k$ for each pixel may appropriately point to the reduced set of basis vectors $\vec{b}_k$ from which the common vectors L have been removed. Where the L basis vectors are common to all pixels, further reduction in data size may be appreciated in the reduction in the bits storing the code. Where K basis vectors are not used in any of the pixels, further reduction in data size may be appreciated in both reduction in the bits storing the code as well as in the transmission of the subset of M−K basis vectors. In an embodiment, shortening the code may be facilitated by deleting certain basis vectors from the code, if certain basis vectors are utilized in every pixel, due to either their contribution to scene power, or commonality in creating the code at 160 or 260. The coefficients of those basis vectors may be given for each pixel in a fixed order. Likewise, in an embodiment, if certain basis vectors were never used in creating the code at 160 or 260, they could be deleted from both the code word and the set of basis vectors $b_k$.

Figure 3:
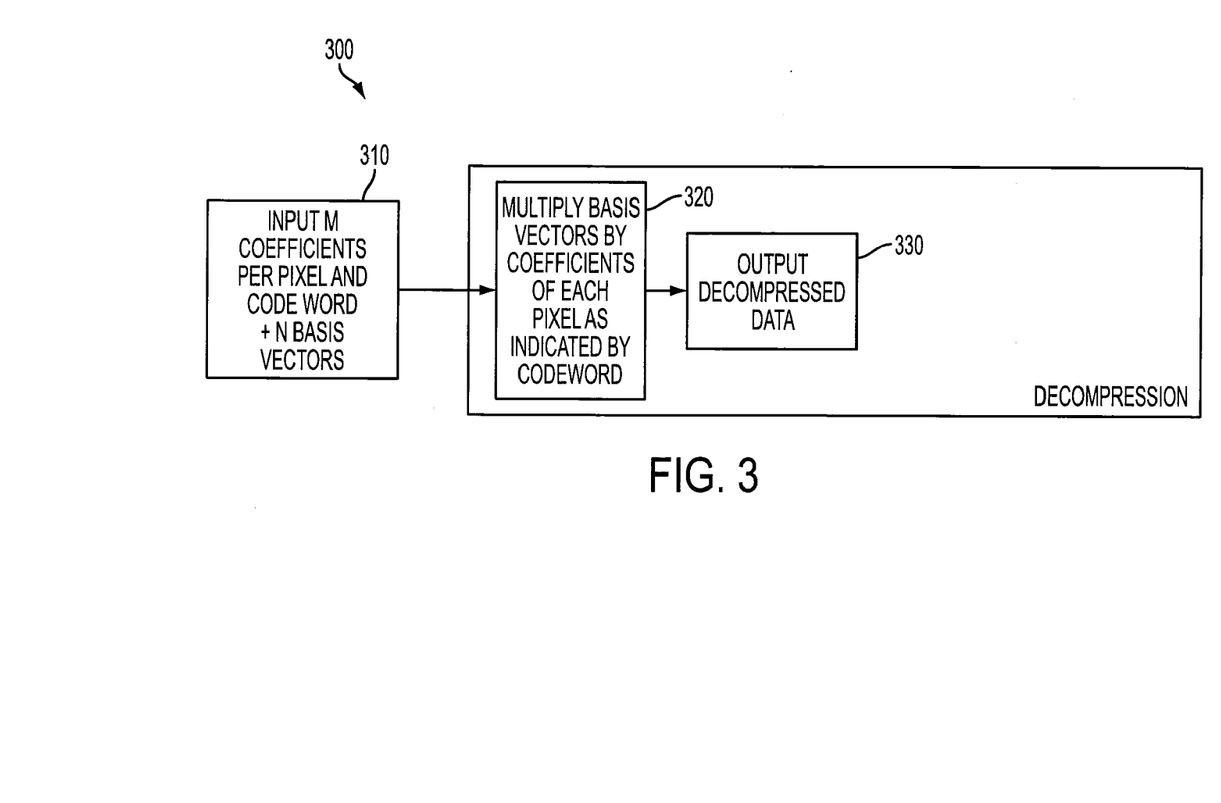
FIG. 3 illustrates an embodiment of a method for decompressing compressed dimensionally reduced data.

Having generated the compressed data through either of methods 100 or 200, or similar methods thereto, it may be appreciated that the compressed data may subsequently be decompressed. FIG. 3 illustrates a method 400 for decompressing data compressed by such compression methods. In the illustrated embodiment, method 400 starts at 410, whereby the compressed data is input or otherwise received at a system performing the method. In various embodiments, the inputting at 410 may comprise receiving or otherwise accessing stored data, which may have been transmit from the system that compressed the data through methods 100 or 200, or may be otherwise recalled by the same system that compressed the data through methods 100 or 200. Regardless, the system performing method 400 may receive a set of compressed pixels $\vec{p}_{comp}$, each containing M-sized sets of coefficients $a_k$, where M may vary from pixel to pixel. Also input at 410 is the code, which in the illustrated embodiment may be appended to the data for each compressed pixel $\vec{p}_{comp}$ (i.e. the set of M coefficients $a_k$). Further input at 410 is the set of N basis vectors associated with the compressed data and the original dimensionally reduced data.

Method 400 may then continue at 420 by multiplying the particular subset of M basis vectors $\vec{b}_k$ that is associated with the M coefficients $a_k$ of the particular compressed pixel $\vec{p}_{comp}$, as determined by the code, with those M coefficients $a_k$. Since each of the basis vectors $\vec{b}_k$ contains the full C colors, this process may yield a decompressed pixel spectrum with the full C colors. Similarly to the description above, it may be appreciated that the coefficients $a_k$ and the basis vectors $\vec{b}_k$ may be utilized to approximate the original pixel $\vec{p}$ as a decompressed pixel $\vec{p}_{decomp}$, according to the formula $$P_{decomp} = \sum_{k=1}^{M} a_k \vec{b}_k \approx p,$$

where the sum is over the M retained coefficients.

It may be appreciated that in some embodiments, the decompressed pixel $\vec{p}_{decomp}$ may be reconstituted as an N-dimensional vector, whereby the coefficients $a_k$ that were not utilized to compress the pixel $\vec{p}$ into $\vec{p}_{comp}$ are assigned as zeros. This would create a decompressed pixel in the N-dimensional DIMRED space. Additionally, in some embodiments, the data may be reconstituted as any other appropriate dimension, It may be appreciated that to go from DIMRED space to full dimension vectors, one may multiply each basis vector by the corresponding coefficient $a_k$ in that pixel. The basis vectors are full dimension, and the process creates a weighted sum of the basis vectors, which is a close approximation to the original pixel in full dimension space, differing by the residual. In an embodiment, the dimensionality of the decompressed pixels $\vec{p}_{decomp}$ may be equal to the largest value of M found across the set of compressed pixels $\vec{p}_{comp}$ in the compressed data. Having formed the decompressed pixel $\vec{p}_{decomp}$ for each spatial location, method 400 may continue at 430 by outputting the decompressed data, comprising the set of decompressed pixels $\vec{p}_{decomp}$.

It may be appreciated that, in some embodiments, the methods disclosed herein may facilitate selection of the set of N basis vectors from one or more or a plurality of processes, so as to form the compressed data. For example, in an embodiment, if a certain percentage of pixels associated with the HSI or DIMRED data from a first processing technique yield a given error level, but the HSI or DIMRED data associated with the remainder of the pixels have a greater error level, then if a second processing technique provides a lesser error level for the HSI or DIMRED data associated with those other pixels, the DIMRED data associated with each processing techniques may be intermingled so as to provide less error for the same compressed volume of data. A portion of the compressed data may be utilized to identify which processing technique is associated with which data. Specifically, in an embodiment the identification of which processing technique was utilized with the basis vectors for a given pixel may be included as part of the code associated with the set of M coefficients per pixel.

In various embodiments the methods described herein may be performed on any number of hyperspectral imaging systems, or on any computing systems configured to receive hyperspectral imagery and/or the DIMRED data associated therewith. The hyperspectral image may be received from any source, on any platform. For example, in some embodiments the hyperspectral image may be obtained from a space based satellite, airplane, or other elevated imaging system. Additionally, in some embodiments the hyperspectral image and/or the DIMRED data may be processed to characterize targets or materials in the imaged scene, or detect changes between various different hyperspectral images captured, or perform other analytics thereon. The hyperspectral imaging system or other computing system performing the methods disclosed herein may contain or otherwise provide a front end interface for one or more local processors associated with the imaging system. In some embodiments, the one or more processors may be configured to analyze the reduced data set for the hyperspectral image prior to compression, or may perform additional dimensionality reduction or compression techniques on the hyperspectral image prior to implementing the compression techniques disclosed herein. As indicated above, in some embodiments, a system configured to perform the compression and/or decompression described herein may additionally be configured to perform the initial DIMRED of the hyperspectral image, wherein the compressed data can be communicated rapidly to a remote station, which may be a ground station or other remote location where the data set can be decompressed for further processing, including but not limited to target detection.

Although in various embodiments the DIMRED methods described herein may be implemented on any appropriate system or hardware, in some embodiments, the DIMRED methods may be implemented on a computer system, which may generally include typical computer components such as one or more processors, memory modules, storage devices, input and output devices, and so on. In an embodiment, such systems may be maintained in an active memory of the computer system to enhance speed and efficiency, and may further be coupled to a computer network and utilize distributed resources associated with the computer network. In various embodiments, systems operating the DIMRED methods may include one or more interfaces, one or more spectrum readers, and one or more modules that may perform establishing the BV set, decomposing the hyperspectral image, evaluating the hyperspectral image, and performing post-processing of the DIMRED data. In some embodiments, the one or more interfaces may be configured to receive data corresponding to one or more hyperspectral images, one or more BVs provided by a user, an indication as to whether dimensionality reduction is to be performed as a lossy or lossless operation, tolerance levels for the amount of lost data in the dimensionality reduction, and/or other information relating to the processing of hyperspectral images. In an embodiment, the one or more interfaces may be arranged to receive information directly from the user via an input device associated with the system performing the DIMRED and/or compression methods, or directly from a component of the system or systems. Systems configured to perform the decompression may be similarly configured in some embodiments.

According to an embodiment, implementations of the various systems and methods for reducing dimensionality of hyperspectral images described herein may be made in hardware, firmware, software, or various combinations thereof. For example, the systems and methods for reducing dimensionality of hyperspectral images may be implemented as computer executable instructions stored on a non-transitory machine readable medium, which may be read and executed using one or more physically separate or communicatively coupled computer systems or other processing devices. The machine readable medium may include various mechanisms for storing and/or transmitting information in a manner readable by the computer systems, the processing devices, or other machines. For example, a machine readable storage medium may include read only memory, random access memory, magnetic disk storage media, optical storage media, flash memory devices, hard drives, and other media for storing information, and a machine readable transmission media may include signals such as carrier waves, infrared signals, digital signals, and other media for transmitting information. Additionally, although the above disclosure may describe methods, firmware, software, routines, or instructions in terms of specific exemplary aspects and implementations and performing certain actions, it will be apparent that such descriptions are merely for the sake of convenience and that such actions in fact result from the computer systems, the processing devices, processors, controllers, or other devices or machines executing the firmware, software, routines, or instructions.

Furthermore, aspects and implementations may be described in the above disclosure as including particular features, structures, or characteristics, but it will be apparent that every aspect or implementation may or may not necessarily include the particular features, structures, or characteristics. Further, where particular features, structures, or characteristics have been described in connection with a specific aspect or implementation, it will be understood that such features, structures, or characteristics may be included with other aspects or implementations, whether or not explicitly described. Thus, various changes and modifications may be made to the preceding disclosure without departing from the scope or spirit of the inventive concept, and the specification and drawings should therefore be regarded as exemplary only, with the scope of the invention determined solely by the appended claims.

The invention claimed is:

1. A method for compressing hyperspectral image data having a number of spatial pixels associated with a hyperspectral image, and a number of spectral dimensions associated with each spatial pixel, the method comprising:

receiving sets of coefficients associated with each pixel of the hyperspectral image data, a set of basis vectors utilized to generate the dimensionally reduced data from the hyperspectral image, and a maximum error value;

verifying whether the set of basis vectors is a set of orthonormal basis vectors if unknown, and if not, converting the set of basis vectors to the set of orthonormal basis vectors, and modifying the coefficients in response to said converting;

ranking, using the processor, a magnitude of each of the set of coefficients on a per pixel basis;

computing, using the processor, a minimal set of coefficients from the set of coefficients by computing an error associated with one or more subsets of the set of coefficients and selecting coefficients wherein the magnitude is larger over coefficients where the magnitude is smaller, and comparing the error of the one or more subsets with the received maximum error;

storing an association between the minimal set of coefficients and a subset of the set of orthonormal basis vectors; and outputting, using the processor, compressed data comprising the minimal set of coefficients for each pixel, the set of orthonormal basis vectors, and the association.

2. The method of claim 1, wherein receiving each set of coefficients comprises unmixing, using the processor, the set of basis vectors with the spectral dimensions of each pixel to form the coefficients.

3. The method of claim 1, wherein computing the minimal set of coefficients comprises iteratively removing coefficients from the set of coefficients from smaller magnitude to larger magnitude, and computing the error associated with each remaining subset of the set of coefficients having the larger magnitude, until the computed error of the remaining subset becomes greater than the received maximum error value.

4. The method of claim 1, wherein computing the minimal set of coefficients comprises iteratively adding coefficients from the set of coefficients to a compressed set of coefficients from larger magnitude to smaller magnitude, until the error, computed from each larger set of compressed coefficients, becomes less than the received maximum error value.

5. The method of claim 1, wherein storing the association between the minimal set of coefficients and the subset of the set of orthonormal basis vectors comprises appending the association to the minimal set of coefficients for each pixel of the compressed data.

6. The method of claim 1, wherein the set of basis vectors are statistically derived or geometrically derived.

7. A method for compressing hyperspectral image data having a number of spatial pixels associated with a hyperspectral image, and a number of spectral dimensions associated with each spatial pixel, the method comprising:
receiving:
sets of coefficients associated with each pixel of the hyperspectral image data, and an error magnitude associated with each pixel of the hyperspectral image data,
a set of basis vectors utilized to generate the dimensionally reduced data from the hyperspectral image,
and a maximum data size;
verifying whether the set of basis vectors is a set of orthonormal basis vectors if unknown, and if not, converting the set of basis vectors to the set of orthonormal basis vectors and modifying the coefficients in response to said converting;
ranking, using the processor, a magnitude of each of the set of coefficients;
computing, using the processor, a maximum number of coefficients based on the maximum data size;
selecting, using the magnitude of each of the set of coefficients and the maximum number of coefficients, a maximum sized subset of the set of coefficients;
storing an association between the maximum sized subset of the set of coefficients and a subset of the set of orthonormal basis vectors; and
outputting, using the processor, compressed data comprising the maximum sized subset of the set of coefficients for each pixel, the set of orthonormal basis vectors, and the association.

8. The method of claim 7, wherein receiving each set of coefficients comprises unmixing, using the processor, the set of basis vectors with the spectral dimensions of each pixel to form the coefficients.

9. The method of claim 7, wherein computing the maximum number of coefficients comprises dividing the maximum data size by a size of each coefficient.

10. The method of claim 7, wherein computing the maximum number of coefficients comprises iteratively adding coefficients from the set of coefficients to a compressed set of coefficients from larger magnitude to smaller magnitude, until a data size of the compressed set reaches the maximum data size.

11. The method of claim 7, wherein storing the association between the maximum sized subset of the set of coefficients and the subset of the set of orthonormal basis vectors comprises appending the association to the maximum sized subset of the set of coefficients for each pixel of the compressed data.

12. The method of claim 7, wherein the set of basis vectors are statistically derived or geometrically derived.

13. A method of decompressing compressed hyperspectral image data comprising:
receiving (i) sets of coefficients associated with a hyperspectral image, each set being associated with a spatial pixel of the hyperspectral image, (ii) a set of basis vectors associated with the hyperspectral image, and (iii) an association between the sets of coefficients and the set of basis vectors;
multiplying each of the set of basis vectors by the coefficients of each spatial pixel according to the association to form an approximation of the hyperspectral image data; and
outputting the approximation of the hyperspectral image data.

14. The method of claim 13, wherein the association is appended to the sets of coefficients.

15. The method of claim 13, wherein two or more of the sets of coefficients, the set of basis vectors, and the association are packaged together.

* * * * *